US008890340B2

(12) United States Patent
Honkanen et al.

(10) Patent No.: US 8,890,340 B2
(45) Date of Patent: Nov. 18, 2014

(54) FAN CONFIGURATION FOR AN ENGINE DRIVEN GENERATOR

(75) Inventors: Paul E. Honkanen, Sheboygan Falls, WI (US); Adam L. Clouse, Chilton, WI (US); Robert J. Danforth, III, Sheboygan Falls, WI (US)

(73) Assignee: Kohler, Inc., Kohler, WI (US)

(*) Notice: Subject to any disclaimer, the term of this patent is extended or adjusted under 35 U.S.C. 154(b) by 110 days.

(21) Appl. No.: 13/289,191

(22) Filed: Nov. 4, 2011

(65) Prior Publication Data

US 2013/0113219 A1 May 9, 2013

(51) Int. Cl.
*F02B 63/04* (2006.01)
*H02K 7/18* (2006.01)
*F02B 63/00* (2006.01)

(52) U.S. Cl.
CPC .................................... *F02B 63/044* (2013.01)
USPC ..................... 290/1 A; 123/2; 310/52; 310/89

(58) Field of Classification Search
CPC ......... F01P 5/02; F01P 11/12; F01P 2060/16; F01P 2025/52; F01P 7/08; F01P 7/087; H02K 9/02; H02K 9/06; B60H 1/3226
USPC ................... 123/2, 41.7; 290/1 A; 310/52, 89
See application file for complete search history.

(56) References Cited

U.S. PATENT DOCUMENTS

| | | | | |
|---|---|---|---|---|
| 3,276,220 | A | 10/1966 | Miner | |
| 3,638,718 | A | 2/1972 | Illg | 165/287 |
| 4,313,402 | A | 2/1982 | Lehnhoff et al. | |
| 4,677,940 | A * | 7/1987 | Bracht et al. | 123/2 |
| 4,702,201 | A * | 10/1987 | Odo et al. | 123/2 |
| 4,988,930 | A | 1/1991 | Oberheide | |
| 5,021,696 | A | 6/1991 | Nelson | |
| 5,433,175 | A * | 7/1995 | Hughes et al. | 123/2 |
| 5,577,888 | A | 11/1996 | Capdevila et al. | |

(Continued)

FOREIGN PATENT DOCUMENTS

| | | | |
|---|---|---|---|
| EP | 1887197 | A2 | 2/2008 |
| WO | WO-2013067126 | A1 | 5/2013 |
| WO | WO-2013067140 | A1 | 5/2013 |

OTHER PUBLICATIONS

"U.S. Appl. No. 13/288,997, Examiner Interview Summary mailed Aug. 30, 2012", 3 pgs.

(Continued)

*Primary Examiner* — Pedro J Cuevas
(74) *Attorney, Agent, or Firm* — Schwegman, Lundberg & Woessner, P.A.

(57) ABSTRACT

Some embodiments relate to a generator that includes an alternator and an engine. The engine includes an output shaft that is coupled to a rotor of the alternator. The generator further includes a first fan that initially directs air in a first direction which is parallel to a longitudinal axis of the output shaft. A second fan that directs air in a second direction that is orthogonal to the longitudinal axis of the output shaft. The generator further includes an enclosure such that the alternator, the engine, the first fan and the second fan are within the enclosure. In some embodiments, the generator may further include a third fan that directs air in the direction that is orthogonal to the longitudinal axis of the output shaft and a fourth fan that directs air in a direction that is parallel to the longitudinal axis of the output shaft.

17 Claims, 12 Drawing Sheets

(56) References Cited

U.S. PATENT DOCUMENTS

| | | | | |
|---|---|---|---|---|
| 5,745,041 | A | 4/1998 | Moss | |
| 5,890,460 | A * | 4/1999 | Ball et al. | 123/41.7 |
| 5,899,174 | A * | 5/1999 | Anderson et al. | 123/2 |
| 5,908,011 | A | 6/1999 | Stauffer et al. | |
| 5,943,986 | A | 8/1999 | Kern et al. | |
| 6,028,369 | A | 2/2000 | Hirose et al. | |
| 6,039,009 | A | 3/2000 | Hirose | |
| 6,230,667 | B1 * | 5/2001 | Stauffer et al. | 123/2 |
| 6,257,832 | B1 | 7/2001 | Lyszkowski et al. | |
| 6,376,944 | B1 * | 4/2002 | Grizzle et al. | 310/52 |
| 6,407,918 | B1 | 6/2002 | Edmunds et al. | |
| 6,450,133 | B1 * | 9/2002 | Bernard et al. | 123/2 |
| 6,463,891 | B2 | 10/2002 | Algrain et al. | |
| 6,552,454 | B2 * | 4/2003 | Kern et al. | 310/89 |
| 6,630,756 | B2 * | 10/2003 | Kern et al. | 310/52 |
| 6,659,894 | B2 * | 12/2003 | Kern et al. | 474/32 |
| 6,747,432 | B2 | 6/2004 | Yoshimura | |
| 6,784,574 | B2 * | 8/2004 | Turner et al. | 310/58 |
| 6,824,067 | B2 * | 11/2004 | Kern et al. | 236/35 |
| 6,917,121 | B2 | 7/2005 | Akimoto et al. | |
| 6,933,687 | B2 | 8/2005 | Makaran et al. | |
| 7,000,575 | B2 | 2/2006 | Kern et al. | |
| 7,023,101 | B2 * | 4/2006 | Wang | 290/1 A |
| 7,049,707 | B2 * | 5/2006 | Wurtele | 290/1 B |
| 7,111,592 | B1 | 9/2006 | Kern et al. | |
| 7,129,604 | B1 * | 10/2006 | Wang | 310/63 |
| 7,248,004 | B2 | 7/2007 | Strupp | 318/49 |
| 7,492,050 | B2 | 2/2009 | Brandenburg et al. | |
| 7,557,458 | B2 | 7/2009 | Yamamoto et al. | |
| 7,743,739 | B2 | 6/2010 | Kochi et al. | |
| 8,011,896 | B2 | 9/2011 | Wu et al. | |
| 8,314,526 | B2 * | 11/2012 | Fukuda et al. | 310/89 |
| 8,525,359 | B2 * | 9/2013 | Nishimura et al. | 290/1 A |
| 8,544,425 | B2 | 10/2013 | Dorn et al. | 123/3 |
| 8,677,948 | B2 * | 3/2014 | Steffl | 123/2 |
| 8,680,728 | B2 * | 3/2014 | Errera et al. | 310/86 |
| 2002/0121818 | A1 * | 9/2002 | Turner et al. | 310/58 |
| 2002/0195069 | A1 | 12/2002 | Herke et al. | |
| 2003/0011196 | A1 * | 1/2003 | Kern et al. | 290/1 A |
| 2003/0011258 | A1 * | 1/2003 | Kern et al. | 310/112 |
| 2003/0013567 | A1 * | 1/2003 | Kern et al. | 474/32 |
| 2003/0030281 | A1 | 2/2003 | Campion | 290/1 R |
| 2003/0183700 | A1 * | 10/2003 | Kern et al. | 236/34 |
| 2005/0072553 | A1 | 4/2005 | Tigner et al. | |
| 2006/0152007 | A1 | 7/2006 | Ortiz | |
| 2008/0247879 | A1 | 10/2008 | De Filippis et al. | |
| 2009/0301687 | A1 | 12/2009 | Watts | |
| 2011/0115235 | A1 * | 5/2011 | Steffl | 290/1 B |
| 2011/0204651 | A1 * | 8/2011 | Nishimura et al. | 290/1 A |
| 2011/0248511 | A1 * | 10/2011 | Marlenee et al. | 290/1 A |
| 2013/0113218 | A1 | 5/2013 | Dorn et al. | 290/1 A |
| 2013/0113219 | A1 * | 5/2013 | Honkanen et al. | 290/1 A |

OTHER PUBLICATIONS

"U.S. Appl. No. 13/288,997, Examiner Interview Summary mailed Nov. 29, 2012", 1 pg.

"U.S. Appl. No. 13/288,997, Non Final Office Action mailed Aug. 7, 2012", 9 pgs.

"U.S. Appl. No. 13/288,997, Response filed Aug. 27, 2012 to Non Final Office Action mailed Aug. 7, 2012", 6 pgs.

"U.S. Appl. No. 13/288,997, Final Office Action mailed Feb. 28, 2013", 14 pgs.

"U.S. Appl. No. 13/288,997, Response filed Mar. 28, 2013 to Final Office Action mailed Feb. 28, 2013", 9 pgs.

"International Application Serial No. PCT/US2012/062975, International Search Report mailed Jan. 22, 2013", 2 pgs.

"International Application Serial No. PCT/US2012/062975, Written Opinion mailed Jan. 22, 2013", 7 pgs.

"International Application Serial No. PCT/US2012/062996, International Search Report mailed Jan. 22, 2013", 2 pgs.

"International Application Serial No. PCT/US2012/062996, Written Opinion mailed Jan. 22, 2013", 6 pgs.

"International Application Serial No. PCT/US2012/062975, International Preliminary Report on Patentability mailed May 15, 2014", 9 pgs.

"U.S. Appl. No. 12/288,997, Response filed Jun. 27, 2013 to Non Final Office Action mailed May 8, 2013", 2 pgs.

* cited by examiner

FAN CONFIGURATION FOR AN ENGINE DRIVEN GENERATOR

TECHNICAL FIELD

Embodiments pertain to an engine generator cooling system, and more particularly to a fan configuration for an engine driven generator.

BACKGROUND

Existing cooling systems for engine driven generators typically include belt-driven fans that are used to remove heat from a radiator that serves to cool the engine. These belt-driven fans are usually driven by the engines themselves.

One of the drawbacks with belt-driven fans is that they require the engine to be running in order to perform cooling. In addition, the belt-driven fans typically occupy valuable space within an enclosure that includes the engine driven generator.

Another drawback with belt-driven fans is that the speed of the fan is usually dependent upon the speed of the engine. Therefore, the degree of cooling provided by the belt-driven fan changes based on the speed of the engine instead of being based on the amount of load on the engine. In addition, belt-driven fan commonly generate an undesirable amount of audible noise because of the size and speed of the belt driven fans.

A single fan configuration can result in no cooling being provided when the single fan becomes inoperative. In addition, a single fan configuration also typically only provides a limited number of available air flow paths in which to provide cooling and/or move air through/in/from the engine driven generator.

Therefore, a need exists for an engine driven generator cooling system that may provide adequate cooling while minimizing audible noise. The cooling system may also provide cooling to the radiator even when the engine is not running. Finally, the cooling system may provide cooling even when a fan that forms part of the cooling system becomes inoperative.

DETAILED DESCRIPTION

Figure 1:
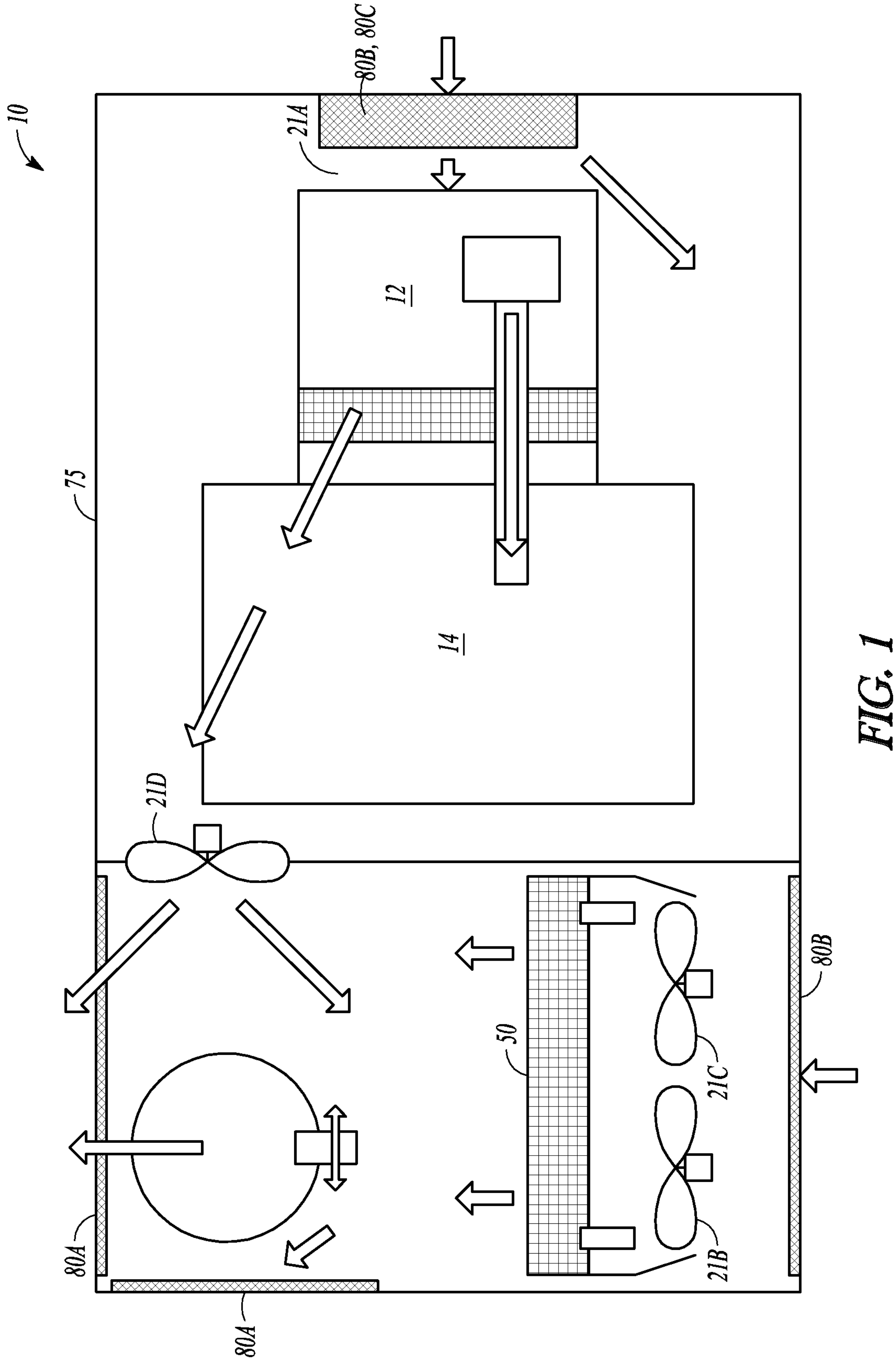
FIG. 1 is a schematic top view of an example engine driven generator.
Figure 2:
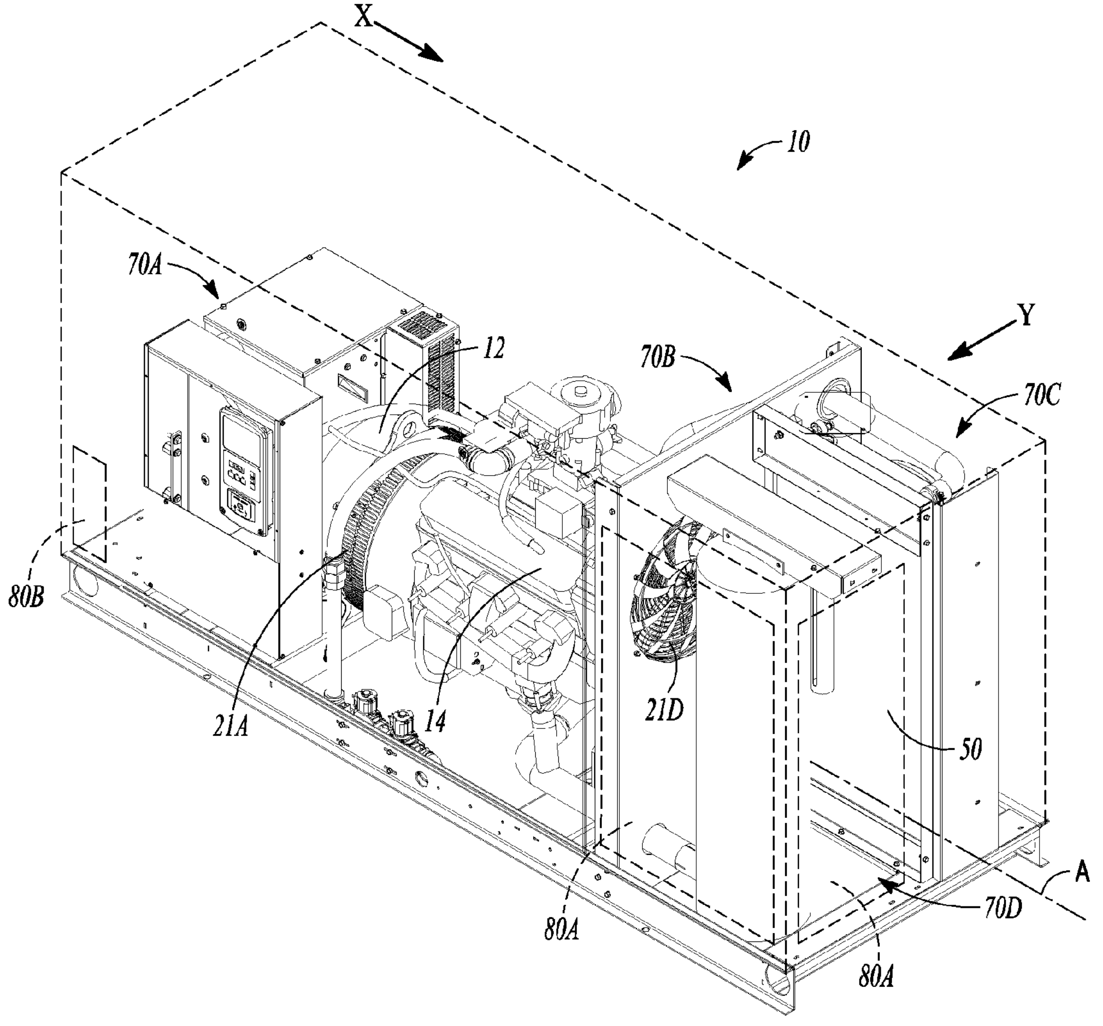
FIGS. 2-5 are perspective views of the example generator shown in FIG. 1 with the exterior enclosure shown in phantom lines.
Figure 3:
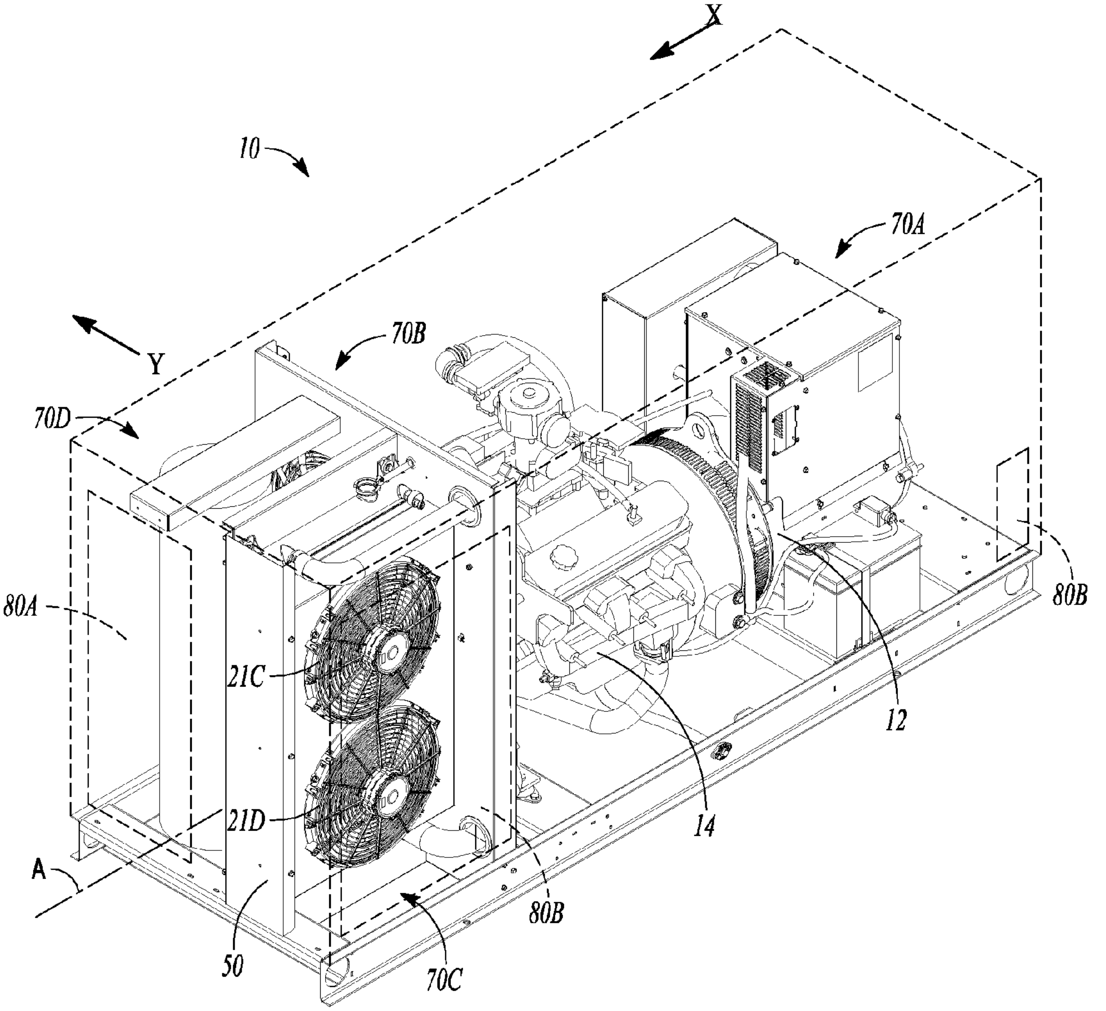
Figure 4:
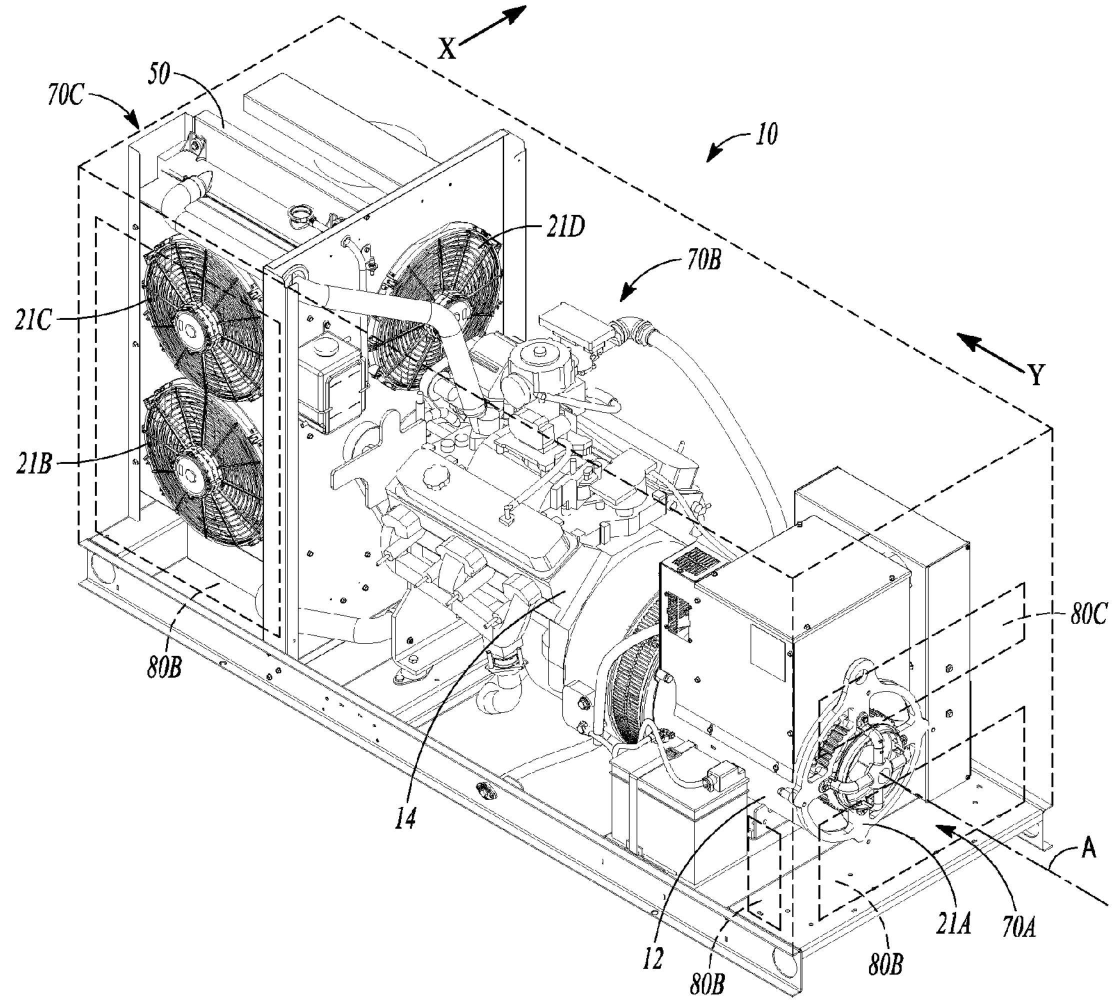
Figure 5:
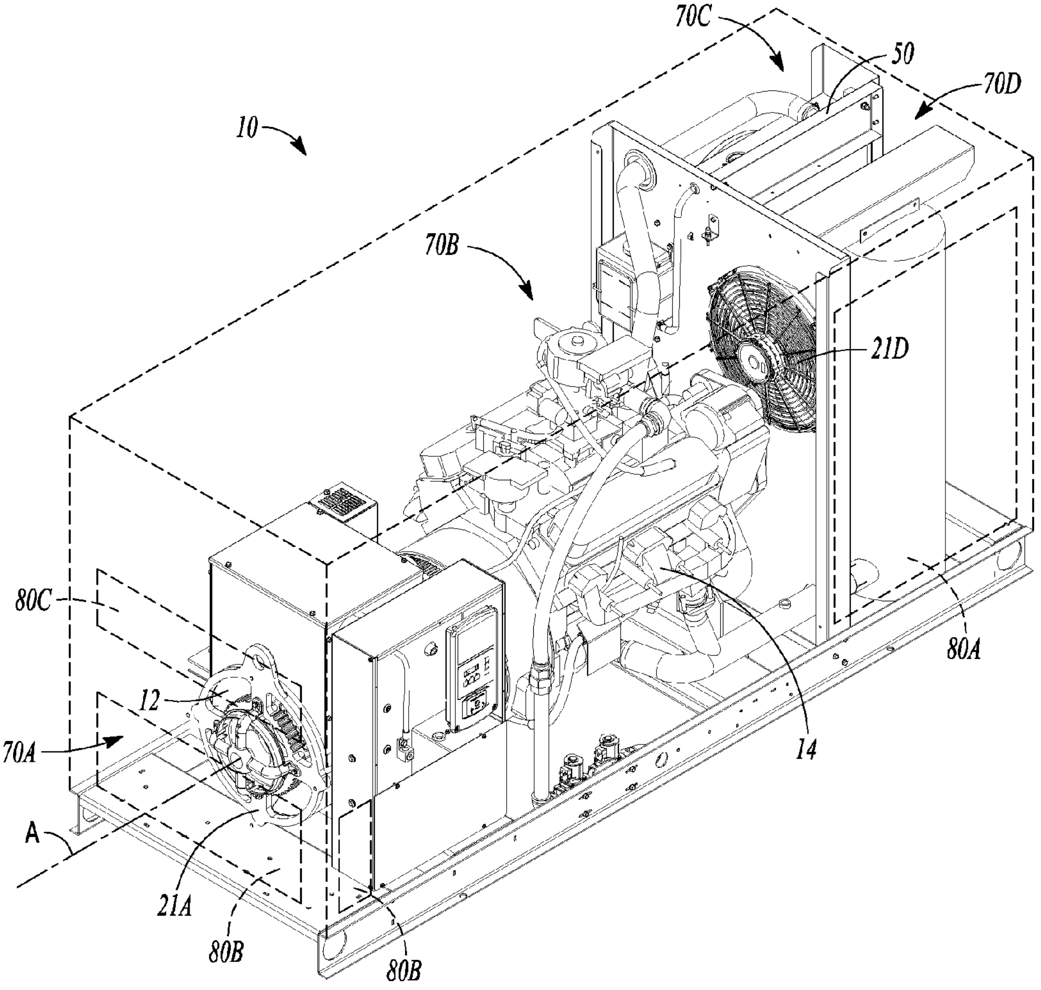
Figure 6:
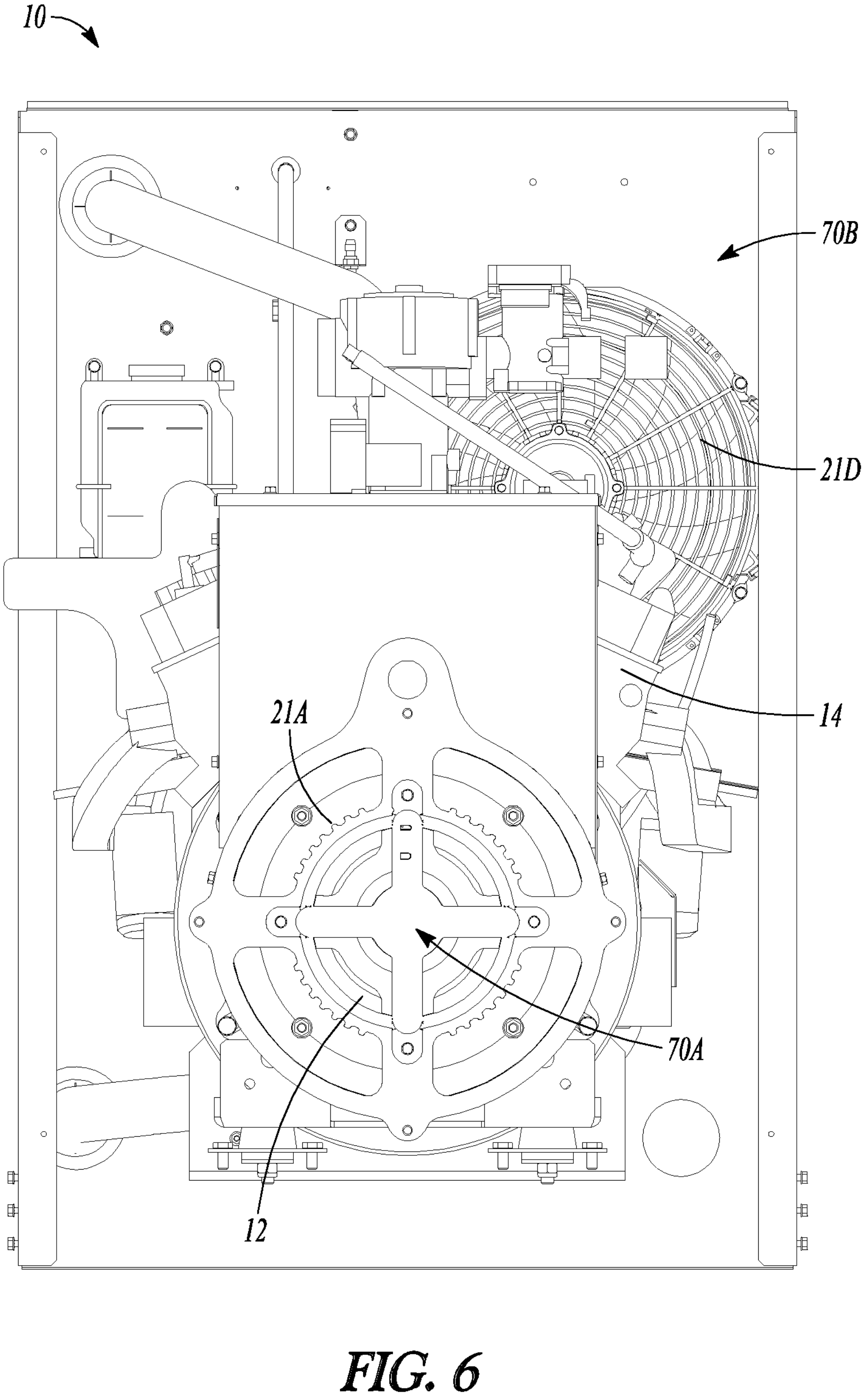
FIG. 6 is a right side view of the interior of the example generator shown in FIG. 1.
Figure 7:
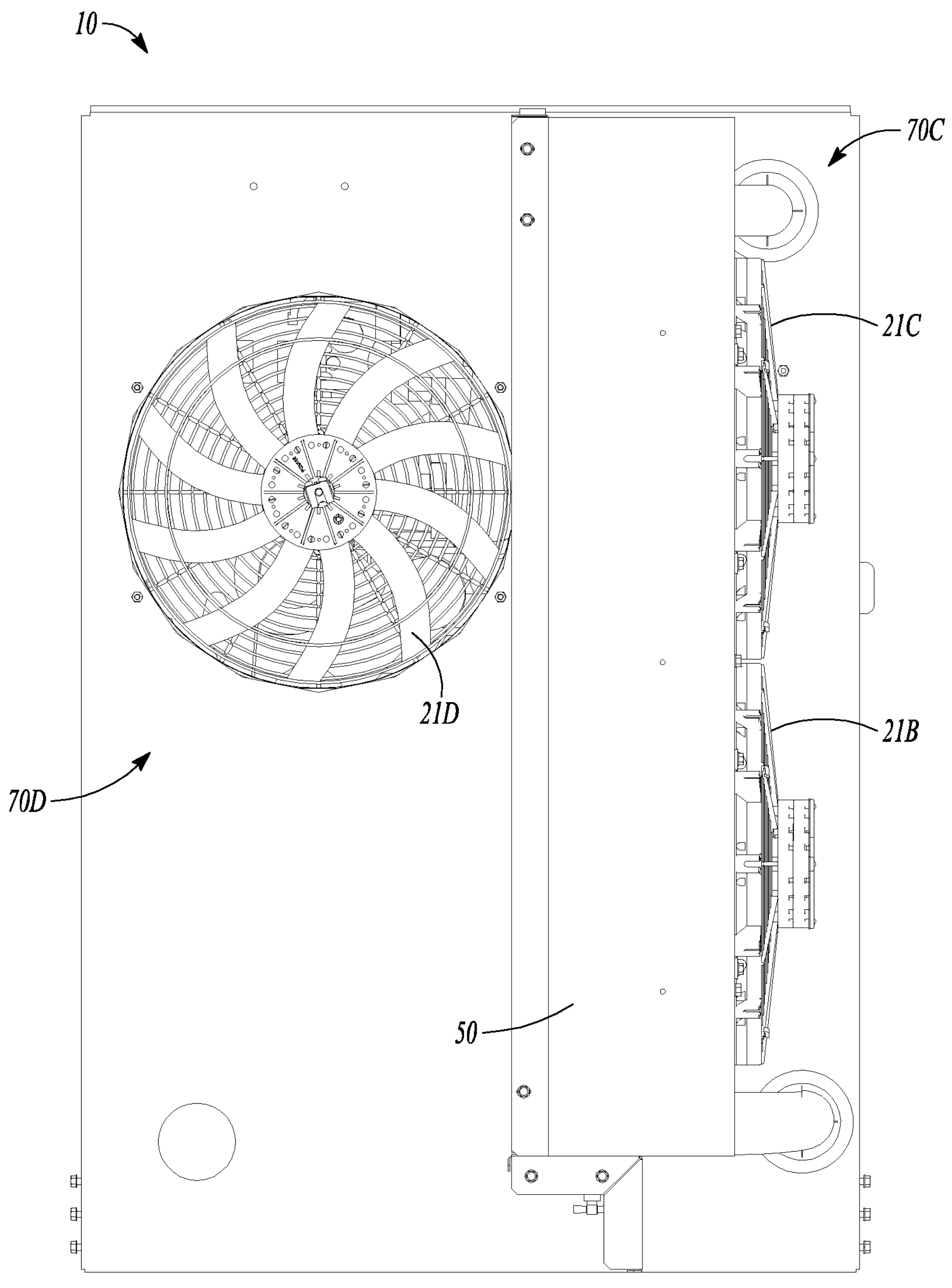
FIG. 7 is a left side view of the interior of the example generator shown in FIG. 1.
Figure 8:
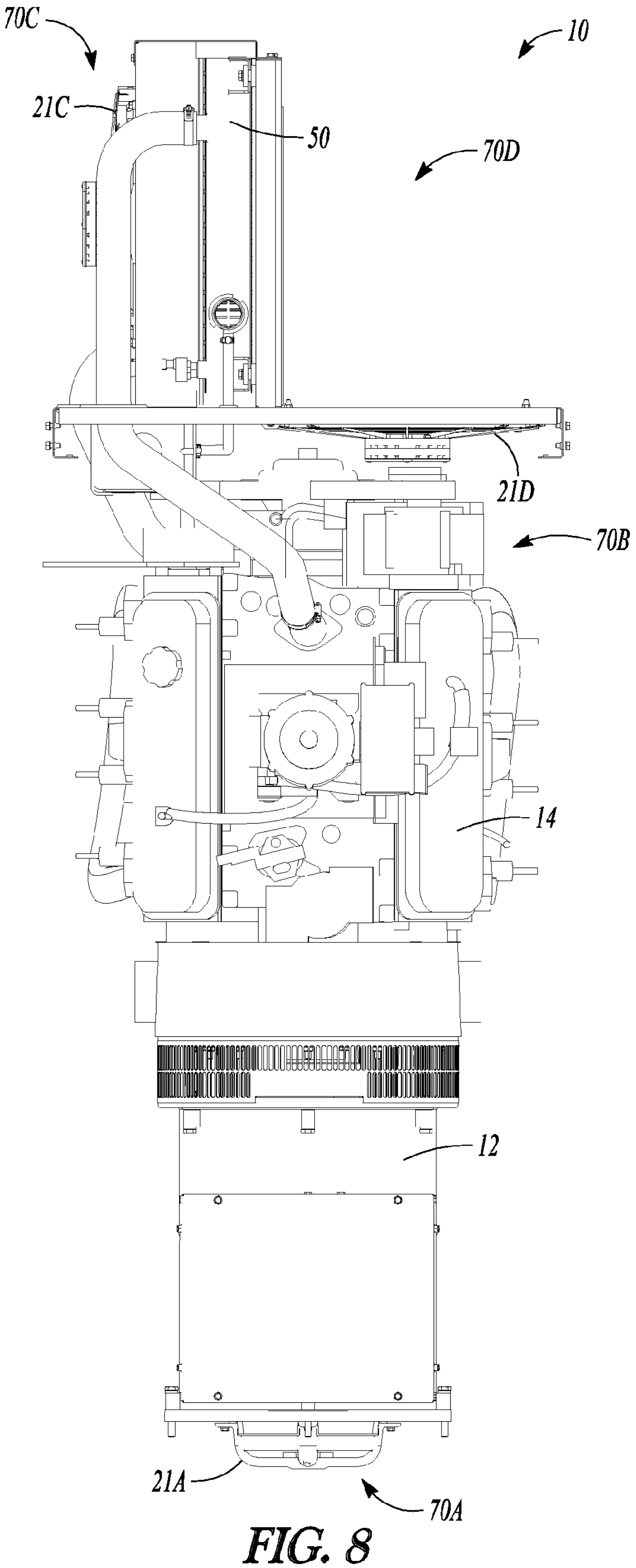
FIG. 8 is a top view of the interior of the example generator shown in FIG. 1.
Figure 9:
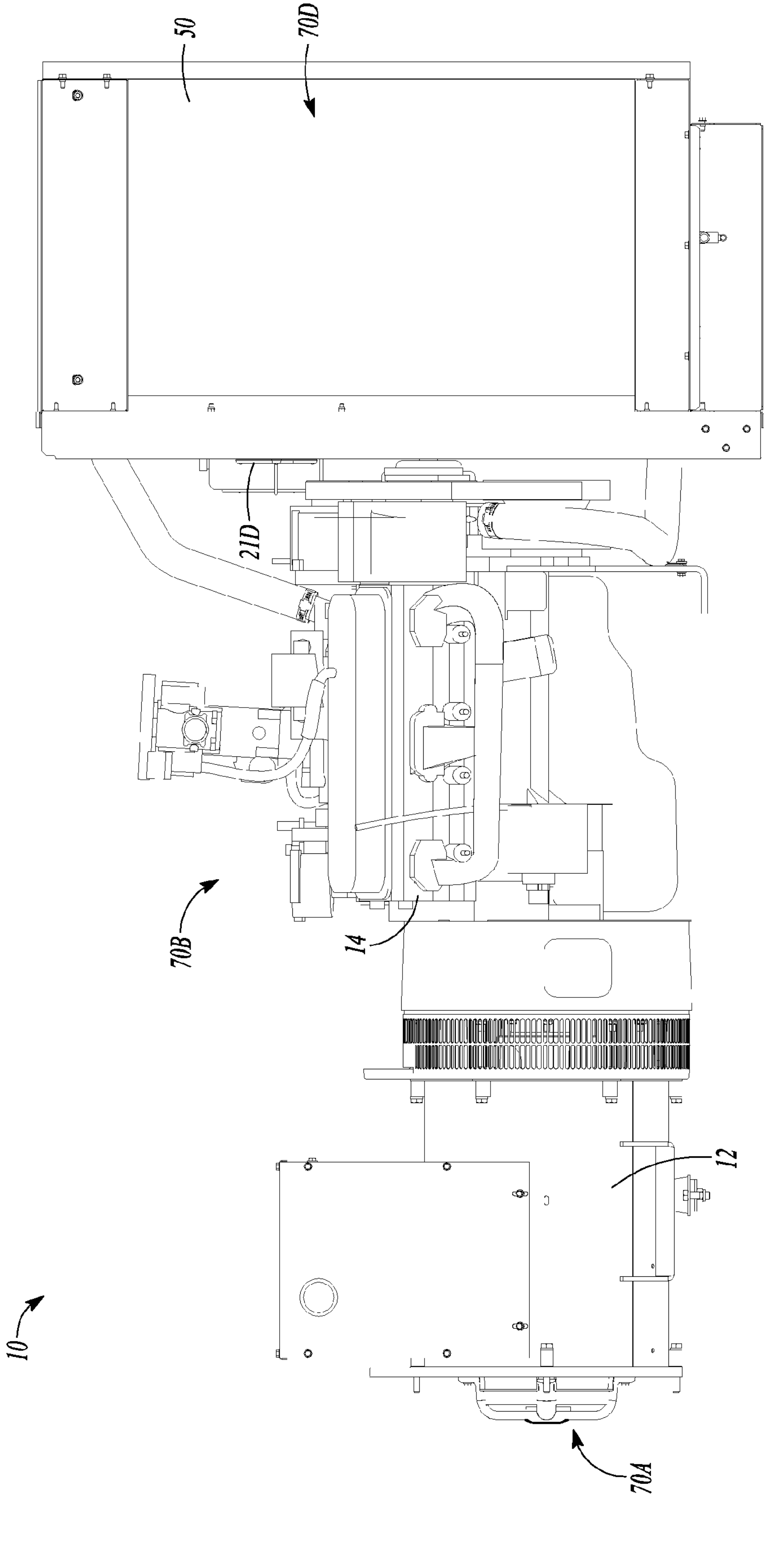
FIG. 9 is a rear view of the interior of the example generator shown in FIG. 1.
Figure 10:
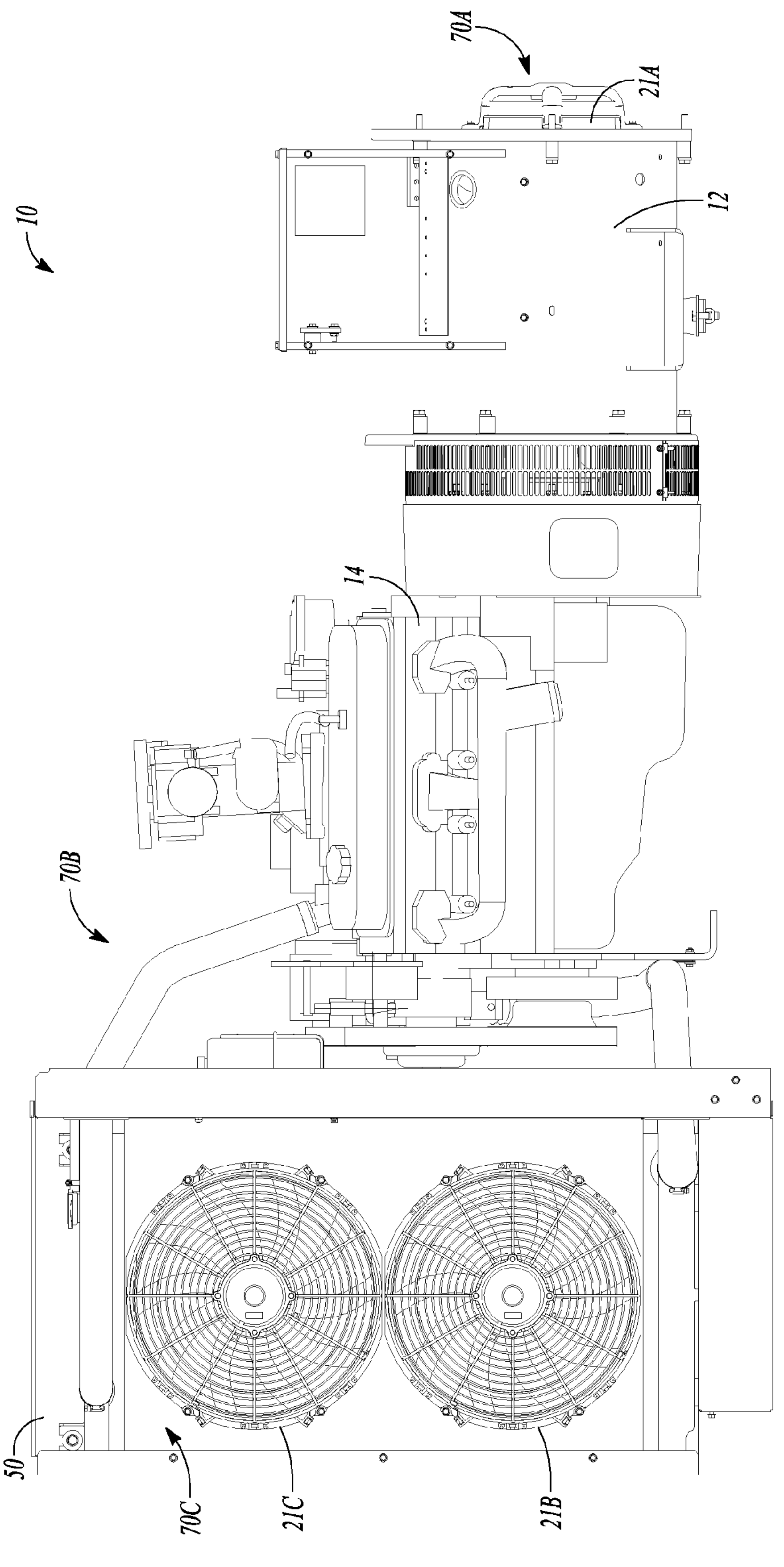
FIG. 10 is a front view of the interior of the example generator shown in FIG. 1.
Figure 11:
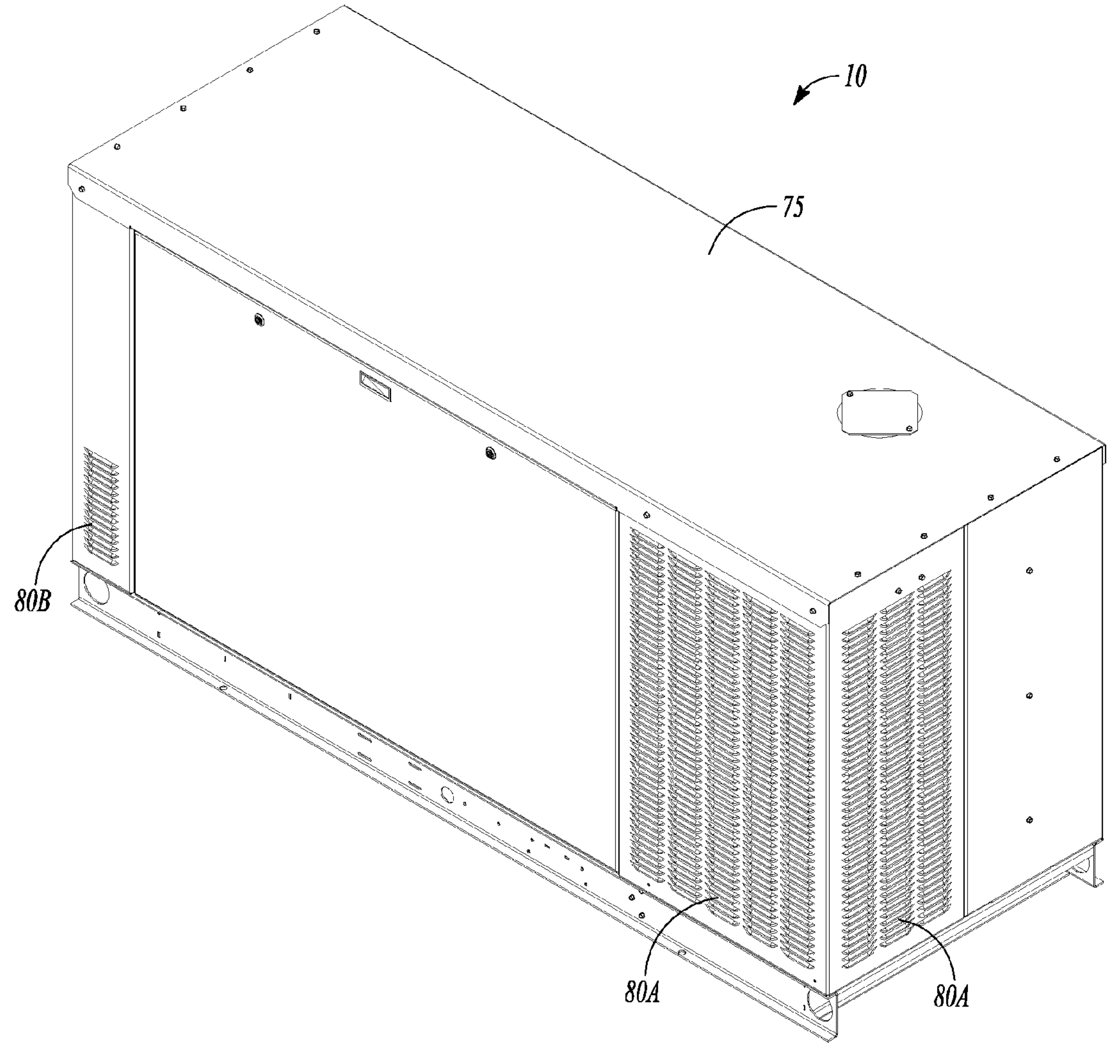
FIGS. 11-12 are perspective views of the example generator shown in FIG. 1 with the exterior enclosure shown in solid lines.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

FIGS. 1-12 illustrate an example generator 10 that includes an alternator 12 and an engine 14. The engine 14 includes an output shaft (not shown) that is coupled to a rotor (not shown) of the alternator 12.

The generator 10 further includes a first fan 21A that initially directs air in a first direction X which is parallel to a longitudinal axis A of the output shaft. A second fan 21B that directs air in a second direction Y that is orthogonal to the longitudinal axis A of the output shaft. In the illustrated example embodiment, the first fan 21A is a centrifugal alternator fan, although in other embodiments the first fan 21A may be something other than a centrifugal alternator fan.

The generator 10 further includes an enclosure 75 such that the alternator 12, the engine 14, the first fan 21A and the second fan 21B are within the enclosure 40. The size, shape and orientation of the enclosure 75 will depend in part on (i) the size and number of the components that are to be placed within the enclosure 75; and/or (ii) the environment where the enclosure 75 is to be located (among other factors).

In some embodiments, the generator 10 may further include a third fan 21C that directs air in the direction Y that is orthogonal to the longitudinal axis A of the output shaft and a fourth fan 21D that directs air in a direction X that is parallel to the longitudinal axis A of the output shaft. In the illustrated example embodiment, the first fan 21A is aligned with the longitudinal axis A of the output shaft and the fourth fan 21D is not aligned with the longitudinal axis A of the output shaft. It should be noted that embodiments are contemplated where the first fan 21A is not aligned with the longitudinal axis A of the output shaft. As examples, one, some or all of the first, second, third and fourth electrical fans 21A, 21B, 21C, 21D may be a 12 volt direct current fan.

In addition, the generator 10 may further include a power supply (not shown) that provides power to the first, second, third and fourth electrical fans 21A, 21B, 21C, 21D. As an example, the power supply may be a DC battery, although other types of power supplies are contemplated. It is also contemplated that the power supply may be powered directly from the alternator 12 or some other power generating device.

As shown most clearly in FIGS. 2-4, 7 and 8, the generator 10 may further include a radiator 50 such that the second fan 21B and the third fan 21C direct (push or pull) air through the radiator 50. In the illustrated example embodiment, the second fan 21B and the third fan 21C are positioned horizontally (FIG. 1) or vertically (FIGS. 2-10) adjacent to one another. It should be noted that embodiments are contemplated where one of the second fan 21B or the third fan 21C do not direct air through the radiator 50.

In some embodiments, the enclosure 75 includes an alternator air intake compartment 70A, engine compartment 70B, radiator air intake compartment 70C and exhaust compartment 70D. In the illustrated example embodiment, the first fan 21A directs air from the alternator air intake compartment 70A to the engine compartment 70B. In addition, the second fan 21B and the third fan 21C may direct air from the radiator air intake compartment 70C to the exhaust compartment 70D, and the fourth 21D fan may direct air from the engine compartment 70B to the exhaust compartment 70D.

Embodiments are also contemplated where the fourth fan 21D directs air outside the enclosure 75 from the engine compartment 70B. In addition, it should be noted that other fans may be added inside the enclosure 75 of the generator 10.

Embodiments are contemplated where the enclosure 75 may include vents 80A (see FIG. 11) such that air is able to exit the enclosure 75 from the exhaust compartment 70D through the vents 80A. In addition, the enclosure may alternatively (or also) include vents 80B (see FIG. 12) such that air is able to enter the enclosure 75 into the alternator air intake compartment 70A and/or the radiator air intake compartment 70C through the additional vents 80B.

It should be noted that references numbers 80A, 80B, 80C refer to example vent locations in FIGS. 2-5. The size, shape and number of individual vents 80A, 80B, 80C may vary depending on particular generator 10 (see, e.g., FIGS. 11-12. The illustration of specific vent details is omitted from FIGS. 2-5 for purposes of clarity.

Figure 12:
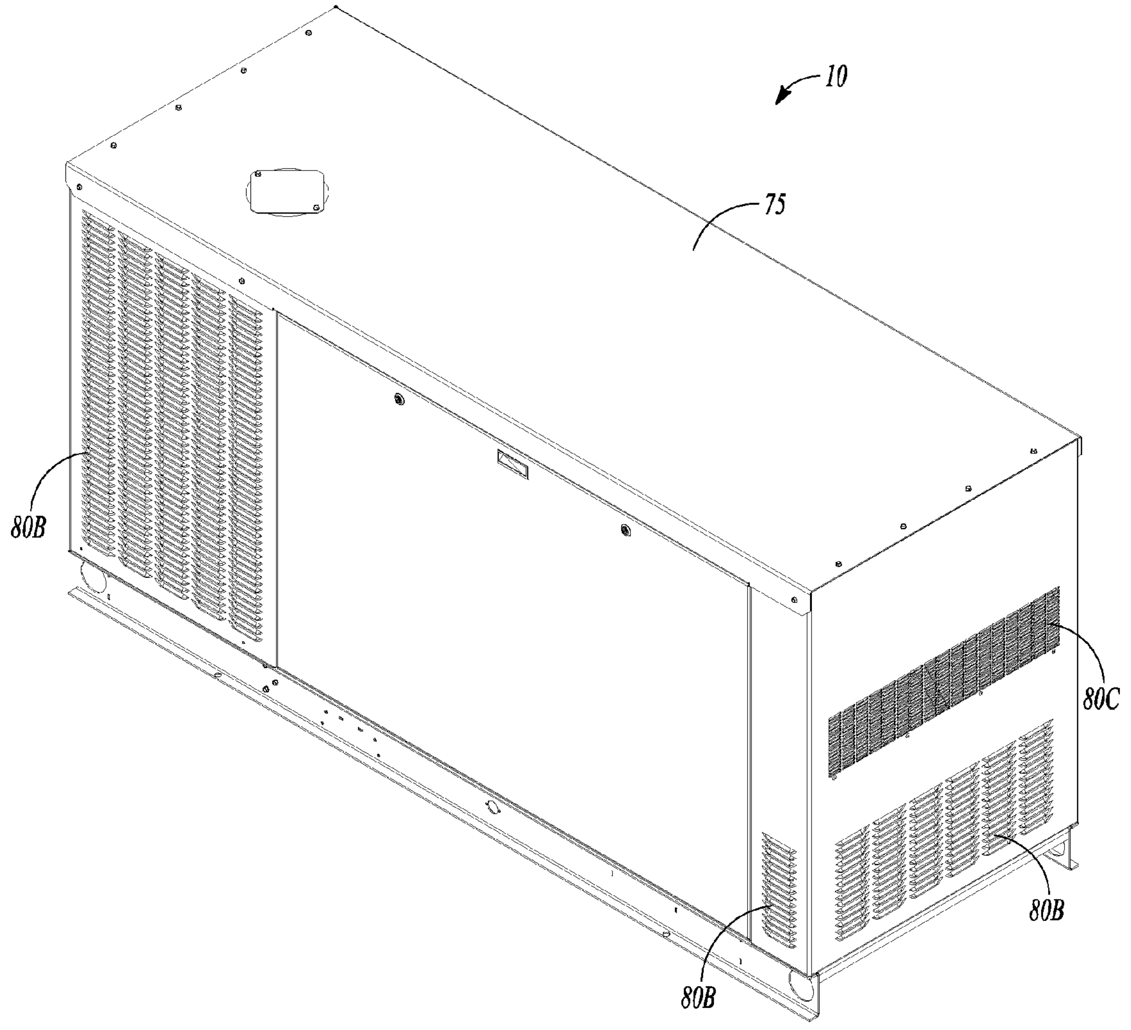

As shown most clearly in FIG. 12, the enclosure 75 may include vents 80C such that air is able to enter the enclosure 75 from the engine compartment 70B through the vents 80C. Embodiments are also contemplated where vents 80A direct air outside the enclosure 75 from the engine compartment 70B (vents 80A of this type are not shown). The type, size, number, location and style of the vents 80A, 80B, 80C will depend on a variety of design considerations associated with each embodiment.

The fan configuration for an engine driven generator described herein may provide cooling while minimizing audible noise. The cooling system may also provide cooling to the radiator even when the engine is not running. Finally, the cooling system may provide cooling even when a fan that forms part of the cooling system becomes inoperative.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A generator comprising:
- an alternator;
- an engine including an output shaft that is coupled to a rotor of the alternator;
- a first fan that directs air in a first direction that is parallel to a longitudinal axis of the output shaft;
- a second fan that directs air in a second direction that is orthogonal to the longitudinal axis of the output shaft;
- an enclosure such that the alternator, the engine, the first fan and the second fan are within the enclosure; and
- a radiator such that the second fan directs air through the radiator.

2. The engine driven generator of claim 1, further comprising an additional fan that directs air in a direction that is orthogonal to the longitudinal axis of the output shaft.

3. The engine driven generator of claim 1, wherein the second fan and the additional fan direct air through the radiator.

4. The engine driven generator of claim 1, further comprising an additional fan that directs air in a direction that is parallel to the longitudinal axis of the output shaft.

5. The engine driven generator of claim 4, wherein the first fan is aligned with the longitudinal axis of the output shaft and the additional fan is not aligned with the longitudinal axis of the output shaft.

6. The engine driven generator of claim 1, further comprising:
- a third fan that directs air in a direction that is orthogonal to the longitudinal axis of the output shaft; and
- a fourth fan that directs air in a direction that is parallel to the longitudinal axis of the output shaft.

7. The engine driven generator of claim 6, wherein the second fan and the third fan direct air through the radiator.

8. The engine driven generator of claim 7, wherein the first fan is aligned with the longitudinal axis of the output shaft and the fourth fan is not aligned with the longitudinal axis of the output shaft.

9. The engine driven generator of claim 1, wherein the first fan is a centrifugal alternator fan.

10. The engine driven generator of claim 8, wherein the enclosure includes an alternator air intake compartment, engine compartment, radiator air intake compartment and exhaust compartment, wherein the first fan directs air from the alternator air intake compartment to the engine compartment.

11. The engine driven generator of claim 10, wherein the second fan and the third fan direct air from the radiator air intake compartment to the exhaust compartment.

12. The engine driven generator of claim 11, wherein the fourth fan directs air from the engine compartment to the exhaust compartment.

13. The engine driven generator of claim 12, wherein the enclosure includes vents such that air is able to exit the enclosure from the exhaust compartment through the vents.

14. The engine driven generator of claim 13, wherein the enclosure includes additional vents such that air is able to exit the enclosure from the engine compartment through the additional vents.

15. The engine driven generator of claim 13, wherein the enclosure includes additional vents such that air is able to enter the enclosure into the alternator air intake compartment and the radiator air intake compartment through the additional vents.

16. The engine driven generator of claim 6, further comprising a power supply to provide power to the second, third and fourth fans.

17. The engine driven generator of claim 16, wherein the power supply is a DC battery.

* * * * *